US010351435B2

(12) United States Patent
Wollmershauser et al.

(10) Patent No.: US 10,351,435 B2
(45) Date of Patent: Jul. 16, 2019

(54) NANOCRYSTALLINE ALPHA ALUMINA AND METHOD FOR MAKING THE SAME

(71) Applicant: The Government of the United States of America, as represented by the Secretary of the Navy, Arlington, VA (US)

(72) Inventors: James A. Wollmershauser, Alexandria, VA (US); John Drazin, Alexandria, VA (US); Dana A. Kazerooni, McLean, VA (US); Boris N. Feigelson, Springfield, VA (US); Edward P. Gorzkowski, III, Odenton, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 15 days.

(21) Appl. No.: 15/730,817

(22) Filed: Oct. 12, 2017

(65) Prior Publication Data

US 2018/0111841 A1    Apr. 26, 2018

Related U.S. Application Data

(60) Provisional application No. 62/410,990, filed on Oct. 21, 2016.

(51) Int. Cl.
*C01F 7/02* (2006.01)
*B02C 17/10* (2006.01)
*C01F 7/34* (2006.01)

(52) U.S. Cl.
CPC ............ *C01F 7/023* (2013.01); *B02C 17/10* (2013.01); *C01F 7/34* (2013.01); *C01P 2002/70* (2013.01); *C01P 2002/72* (2013.01); *C01P 2004/04* (2013.01); *C01P 2004/50* (2013.01); *C01P 2004/64* (2013.01); *C01P 2006/12* (2013.01)

(58) Field of Classification Search
CPC ............ C01F 7/023; C01F 7/34; B02C 17/10
See application file for complete search history.

(56) References Cited

U.S. PATENT DOCUMENTS 5,284,809 A    2/1994   Van Dijen
5,782,940 A    7/1998   Jayan et al.
(Continued)

OTHER PUBLICATIONS

H. Li et al., "Alpha-alumina nanoparticles induce efficient autophagy-dependent cross-presentation and potent antitumour response," Nat Nano 6, 645-650 (2011).
(Continued)

*Primary Examiner* — James A Fiorito
(74) *Attorney, Agent, or Firm* — US Naval Research Laboratory; Joslyn Barritt

(57) ABSTRACT

A process for producing metastable nanocrystalline alpha-alumina ($\alpha$-$Al_2O_3$) having particle sizes smaller than 12 nm. Starting crystallites of $\alpha$-$Al_2O_3$ having a particle size larger than 12 nm, typically on the order of about 50 nm, are ball-milled at low temperatures to produce a nanocrystalline $\alpha$-$Al_2O_3$ powder having a particle size of less than 12 nm, i.e., below the theoretical room temperature thermodynamic size limit at which $\alpha$-$Al_2O_3$ changes phase to $\gamma$-$Al_2O_3$, wherein the powder remains in the $\alpha$-$Al_2O_3$ phase at all times.

4 Claims, 5 Drawing Sheets

(56) References Cited

U.S. PATENT DOCUMENTS

2008/0308528 A1 12/2008 Wang
2009/0123362 A1 5/2009 Roesch

OTHER PUBLICATIONS

A. Krell et al., "Transparent Sintered Corundum with High Hardness and Strength," Journal of the American Ceramic Society 86, 12-18 (2003).
H. Lei et al., "Preparation of alumina/silica core-shell abrasives and their CMP behavior," Applied Surface Science 253, 8754-8761 (2007).
J.A. Wollmershauser, et al., "An extended hardness limit in bulk nanoceramics," Acta Materialia 69, 9-16 (2014).
M.A. Meyers, "Mechanical properties of nanocrystalline materials," Progress in Materials Science 51, 427-556 (2006).
R. Apetz, "Transparent Alumina: A Light-Scattering Model," Journal of the American Ceramic Society 86, 480 486 (2003).
J. M. McHale et al., "Surface Energies and Thermodynamic Phase Stability in Nanocrystalline Aluminas," Science 277, 788 (1997).
A. H. Tavakoli et al., "Amorphous Alumina Nanoparticles: Structure, Surface Energy, and Thermodynamic Phase Stability," The Journal of Physical Chemistry C 117, 17123-17130 (2013).
J. F. Nye, Physical Properties of Crystals: Their Representation by Tensors and Matrices, pp. xv-xvi (St Edmundsbury Press Ltd., 2004).
A Navrotsky, "Energetics of nanoparticle oxides: interplay between surface energy and polymorphism," Geochem. Trans. 2003, 4(6), 34 37.
G. P. Johnston et al., "Reactive Laser Ablation Synthesis of Nanosize Alumina Powder," Journal of the American Ceramic Society 75, 3293-3298 (1992).
S. Pu et al., "Disperse fine equiaxed alpha alumina nanoparticles with narrow size distribution synthesized by selective corrosion and coagulation separation," Scientific Reports 5, 11575 (2015).
G. R. Karagedov et al., "Preparation and sintering of nanosized $\alpha$ Al2O3 powder," Nanostructured Materials 11, 559-572 (1999).
Y. S. Yoo et al., "Preparation of $\alpha$-alumina nanoparticles via vapor-phase hydrolysis of AlCl3," Materials Letters 63, 1844-1846 (2009).
Borsella et al., "Laser-driven synthesis of nanocrystalline alumina powders from gas-phase precursors," Applied Physics Letters 63, 1345-1347 (1993).
X. Zhang et al., "Nanocrystalline $\alpha$ Al2O3 with novel morphology at 1000° C.," Journal of Materials Chemistry 18, 2423-2425 (2008).
R. M. Laine et al., "Nano $\alpha$ Al2O3 by liquid-feed flame spray pyrolysis," Nat Mater 5, 710 712 (2006).
R. N. Das et al., "Nanocrystalline a Al2O3 Using Sucrose," Journal of the American Ceramic Society 84, 2421-2423 (2001).
J. W. Drazin et al., "Phase Stability in Nanocrystals: A Predictive Diagram for Yttria-Zirconia," Journal of the American Ceramic Society 98, 1377-1384 (2015).
J. W. Drazin et al., "Phase Stability in Calcia-Doped Zirconia Nanocrystals," Journal of the American Ceramic Society 99, 1778-1785 (2016).
J. G. Li et al., "Synthesis and sintering behavior of a nanocrystalline $\alpha$ alumina powder," Acta Materialia 48, 3103-3112 (2000).
M. Archer et al., "Analysis of cobalt, tantalum, titanium, vanadium and chromium in tungsten carbide by inductively coupled plasma-optical emission spectrometry," Journal of Analytical Atomic Spectrometry 18, 1493-1496 (2003).
D. Chrobak et al., "Deconfinement leads to changes in the nanoscale plasticity of silicon," Nat Nano 6, 480-484 (2011).
Y. Tian et al., "Ultrahard nanotwinned cubic boron nitride," Nature 493, 385-388 (2013).
Sang-Jin Lee et al., "Fabrication of nanosized alumina powders by a simple polymer solution route," Journal of Nanoscience and Nanotechnology, 2006, vol. 6, pp. 3633-3636 (Abstract Only).
Z. Razavi Hesabi, et al., "An investigation on the compressibility of aluminum/nano-alumina composite powder prepared by blending and mechanical milling," Materials Science and Engineering A, 2007, vol. 454-455, pp. 89-98.
Search Report and Written Opinion dated Jun. 29, 2018 in corresponding International Application No. PCT/US2017/056248.

Lab-Synthesized α-Al$_2$O$_3$ Powder

Commercially Prepared α-Al$_2$O$_3$ Powder

NANOCRYSTALLINE ALPHA ALUMINA AND METHOD FOR MAKING THE SAME

CROSS-REFERENCE

This Application is a Nonprovisional of and claims the benefit of priority under 35 U.S.C. § 119 based on Provisional U.S. Patent Application No. 62/410,990 filed on Oct. 21, 2016. The Provisional Application and all references cited herein are hereby incorporated by reference into the present disclosure in their entirety.

TECHNICAL FIELD

The present disclosure relates to alpha-alumina ($\alpha$-$Al_2O_3$), and in particular to nanocrystalline $\alpha$-$Al_2O_3$ and methods for making the same.

BACKGROUND

At the nanoscale, alumina ($Al_2O_3$) shows promise in many applications, ranging from high value areas such as cancer therapy and transparent armor to more conventional areas such as polishing abrasives and cutting tools because of its unique mechanical, optical, and electronic properties. See H. Li et al., "Alpha-alumina nanoparticles induce efficient autophagy-dependent cross-presentation and potent antitumour response," Nat Nano 6, 645-650 (2011); A. Krell et al., "Transparent Sintered Corundum with High Hardness and Strength," Journal of the American Ceramic Society 86, 12-18 (2003); and H. Lei et al., "Preparation of alumina/silica core-shell abrasives and their CMP behavior," Applied Surface Science 253, 8754-8761 (2007); see also U.S. Pat. No. 5,782,940 to P. S. Jayan et al., "Process for the preparation of alumina abrasives" (1998).

For example, alpha-alumina ($\alpha$-$Al_2O_3$), more commonly known as corundum or sapphire, is one of the hardest known oxides behind only stishovite (a high pressure tetragonal $SiO_2$ phase) and boron sub-oxide ($B_6O$, an oxygen deficient metalloid). Dense nano-grained $\alpha$-$Al_2O_3$ ceramics are theorized to have hardness values substantially higher than those for single crystals while maintaining high in-line visible light transmission. See J. A. Wollmershauser, et al., "An extended hardness limit in bulk nanoceramics," Acta Materialia 69, 9-16 (2014); M. A. Meyers, "Mechanical properties of nanocrystalline materials," Progress in Materials Science 51, 427-556 (2006); and R. Apetz, "Transparent Alumina: A Light-Scattering Model," Journal of the American Ceramic Society 86, 480-486 (2003).

However, the crystal structure of alumina at the nanoscale depends on the crystallite size of the nanoparticle; consequently, the mechanical, optical, and electronic properties can vary dramatically and non-monotonically with particle size. See J. M. McHale et al., "Surface Energies and Thermodynamic Phase Stability in Nanocrystalline Aluminas," Science 277, 788 (1997); and A. H. Tavakoli et al., "Amorphous Alumina Nanoparticles: Structure, Surface Energy, and Thermodynamic Phase Stability," The Journal of Physical Chemistry C 117, 17123-17130 (2013).

The origin of the crystal structure versus crystallite size relationship is found to be contingent on the surface energy of the crystal structure. See McHale, supra. Therefore, the various synthesis routes which control the particle size result in the formed crystallites adopting one of the various crystal structures of alumina (including $\gamma$, $\delta$, $\chi$, $\eta$, $\theta$, $\kappa$, and $\alpha$), each with their own set of symmetry-dependent properties. See J. F. Nye, Physical Properties of Crystals: Their Representation by Tensors and Matrices, pp. xv-xvi (St Edmundsbury Press Ltd., 2004).

At the nanoscale, thermodynamics generally drives the crystal structure to alpha- ($\alpha$-), gamma- ($\gamma$-), or amorphous alumina (a-$Al_2O_3$). Theoretical and experimental studies show that $\alpha$-$Al_2O_3$ has a significantly higher surface energy (2.64 $J/m^2$) than $\gamma$-$Al_2O_3$ (1.67 $J/m^2$) or a-$Al_2O_3$ (0.97 $J/m^2$). See A. Navrotsky, "Energetics of nanoparticle oxides: interplay between surface energy and polymorphism," Geochem. Trans. 2003, 4(6), 34-37.

FIGS. 1A and 1B are plots illustrating the relationship of specific surface area (FIG. 1A) and particle size (FIG. 1B) to the thermodynamic stability of $\alpha$-$Al_2O_3$, $\gamma$-$Al_2O_3$, and amorphous alumina (a-$Al_2O_3$).

Different surface energies are known to stabilize different polymorphs, see Navrotsky, supra, and, as particle size is reduced, the increase in specific surface area relative to volume changes the relative energy of finite sized crystal particles. As illustrated in FIG. 1A, the high surface energy of $\alpha$-$Al_2O_3$ relative to $\gamma$-$Al_2O_3$ causes $\alpha$-$Al_2O_3$ to become thermodynamically unstable, i.e., to have higher excess enthalpy with respect to $\gamma$-$Al_2O_3$ when the $Al_2O_3$ material has specific surface areas larger than ~100-130 $m^2/g$, see McHale, supra, and Tavakoli, supra, such that particles having such surface areas undergo a phase change from $\alpha$-$Al_2O_3$ to $\gamma$-$Al_2O_3$, Similarly, the relatively high surface energy of $\gamma$-$Al_2O_3$ causes it to become unstable with respect to a-$Al_2O_3$ at specific surface areas larger than ~370 $m^2/g$ (see FIG. 1A), producing a phase change from $\gamma$-$Al_2O_3$ to a-$Al_2O_3$ in particles of that size. Since the ratio of atomic surface to atomic volume increases as the particle size is reduced, these thermodynamic determinations point to size-dependent effects at the nanoscale. Assuming a spherical particle shape whose size equals the crystal size, the surface area of $Al_2O_3$ nanoparticles larger than ~11-12 nm should cause such particles to have an alpha structure, while $Al_2O_3$ nanoparticles smaller than ~3-5 nm will be amorphous (see FIG. 1B). Alumina nanoparticles from 5-11 nm adopt the gamma structure.

However, synthesis of nanocrystalline $Al_2O_3$ typically results in $\gamma$-$Al_2O_3$ when the crystallite size is ~20-50 nm and $\alpha$-$Al_2O_3$ when the crystal size is >50 nm.

Alpha-alumina particle sizes larger than those predicted by pure thermodynamic calculations are likely the result of the fast coarsening kinetics of $\alpha$-$Al_2O_3$. See McHale, supra. Bottom-up synthesis techniques produce small a-$Al_2O_3$ or $\gamma$-$Al_2O_3$ particles which are very stable, even at high temperatures, due to the high energy barrier to $\alpha$-$Al_2O_3$ nucleation. See McHale, supra, and Tavakoli, supra. Converting such particles to $\alpha$-$Al_2O_3$ requires high temperatures, often in excess of ~1000° C. (see G. P. Johnston et al., "Reactive Laser Ablation Synthesis of Nanosize Alumina Powder," Journal of the American Ceramic Society 75, 3293-3298 (1992); and S. Pu et al., "Disperse fine equiaxed alpha alumina nanoparticles with narrow size distribution synthesized by selective corrosion and coagulation separation," Scientific Reports 5, 11575 (2015)). However, $\alpha$-$Al_2O_3$ is known to rapidly coarsen, i.e., develop larger particle sizes, at temperatures above 500° C., see McHale, supra, so that the temperatures needed for phase transformation will cause the small nanostructure to be lost. Thus, purely bottom-up synthesis techniques will inevitably eventually produce $\alpha$-$Al_2O_3$ particles having crystallite sizes much larger than idealized in theoretical considerations.

Despite the difficulties in producing small nanocrystalline $\alpha$-$Al_2O_3$, many works have claimed to find intricate and novel methods to synthesize bulk amounts of small $\alpha$-$Al_2O_3$ nanoparticles. Karagedov et al. synthesized ~25 nm $\alpha$-$Al_2O_3$ nanoparticles using a ball mill with an unidentified "grinding catalyst." See G. R. Karagedov et al., "Preparation and sintering of nanosized $\alpha$-$Al_2O_3$ powder," *Nanostructured Materials* 11, 559-572 (1999). Yoo et al. used $AlCl_3$ with vapor phase hydrolysis to make an alumina precursors to be calcined into $\alpha$-$Al_2O_3$ that had particle sizes of about 35 nm. See Y. S. Yoo et al., "Preparation of $\alpha$-alumina nanoparticles via vapor-phase hydrolysis of $AlCl_3$," *Materials Letters* 63, 1844-1846 (2009). Borsella et al. used laser synthesis from gaseous precursors to synthesize 15-20 nm $\alpha$-$Al_2O_3$. See Borsella et al., "Laser-driven synthesis of nanocrystalline alumina powders from gas-phase precursors," *Applied Physics Letters* 63, 1345-1347 (1993). Zhang et al. calcined boehmite ($\gamma$-AlO(OH)) at 1000° C. to obtained rod like $\alpha$-$Al_2O_3$ with sizes of 15 nm by 150 nm. See X. Zhang et al., "Nanocrystalline $\alpha$-$Al_2O_3$ with novel morphology at 1000° C.," *Journal of Materials Chemistry* 18, 2423-2425 (2008). Laine et al. utilized a liquid-feed flame spray pyrolysis to convert mixtures of intermediate alumina phases into $\alpha$-$Al_2O_3$ with the smallest size being 30 nm. See R. M. Laine et al., "Nano $\alpha$-$Al_2O_3$ by liquid-feed flame spray pyrolysis," *Nat Mater* 5, 710-712 (2006). Das et al. used thermal decomposition of an aqueous solution of aluminum nitrate and sucrose which was subsequently calcined to get a 20 nm sized particles. See R. N. Das et al., "Nanocrystalline $\alpha$-$Al_2O_3$ Using Sucrose," *Journal of the American Ceramic Society* 84, 2421-2423 (2001).

However, these methods still produce $\alpha$-$Al_2O_3$ larger than the thermodynamic limit of ~12 nm, which reinforces the assumption that 12 nm is a lower limit to the size of an $\alpha$-$Al_2O_3$ nanoparticle.

A very recent work has demonstrated the possibility that $Al_2O_3$ can be coerced into the alpha structure below 12 nm. Pu et al. used a low yield selective corrosion and refined fractionated coagulation separation technique to synthesize 10 nm $\alpha$-$Al_2O_3$. See Pu, supra. The Pu technique used Fe to stabilize the surface energy of $\alpha$-$Al_2O_3$ and precipitated $\alpha$-$Al_2O_3$ within a solid Fe grain. Though high nanoparticle yield and ease of industrial scale-up are not practical for such an approach, it demonstrates the possibility of metastability of $\alpha$-$Al_2O_3$ below the thermodynamic size limit.

However, all of these prior methods rely on expensive and unique machines that produce limited quantities of powder which hinders those techniques from leading the industrial production of nanocrystalline $\alpha$-$Al_2O_3$ at or below the thermodynamics size limit.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a process for producing metastable nanocrystalline alpha-alumina ($\alpha$-$Al_2O_3$) having nanoparticle sizes smaller than 12 nm.

In accordance with the present invention, starting crystallites of $\alpha$-$Al_2O_3$ having a particle size larger than 12 nm, typically on the order of about 50 nm, are ball-milled using a WC-Co media to produce a nanocrystalline $\alpha$-$Al_2O_3$ powder having a particle size of less than 12 nm, i.e., below the theoretical room temperature thermodynamic size limit at which $\alpha$-$Al_2O_3$ changes phase to $\gamma$-$Al_2O_3$, wherein the powder remains in the $\alpha$-$Al_2O_3$ phase at all times.

The process in accordance with the present invention provides an economical, scalable industrial, scalable, and economical procedure that provides a new avenue for nanocrystalline $\alpha$-$Al_2O_3$ processing. This processing route is unique and vitally important given that $\alpha$-$Al_2O_3$ does not ordinarily exist at these crystallite sizes and that the current bottom-up synthesis approaches can only produce $\gamma$-$Al_2O_3$, which is an undesired phase for many applications, at these small crystal sizes.

DETAILED DESCRIPTION

Figure 1A:
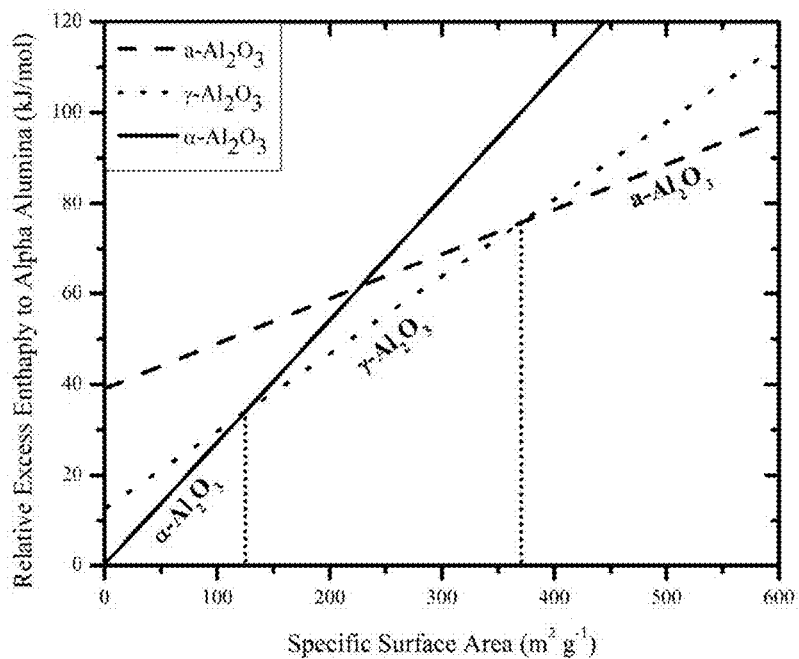
FIGS. 1A and 1B are plots illustrating the thermodynamic instability (excess enthalpy) of the three alumina polymorphs as a function of surface energy (FIG. 1A) and particle size (FIG. 1B).
Figure 1B:
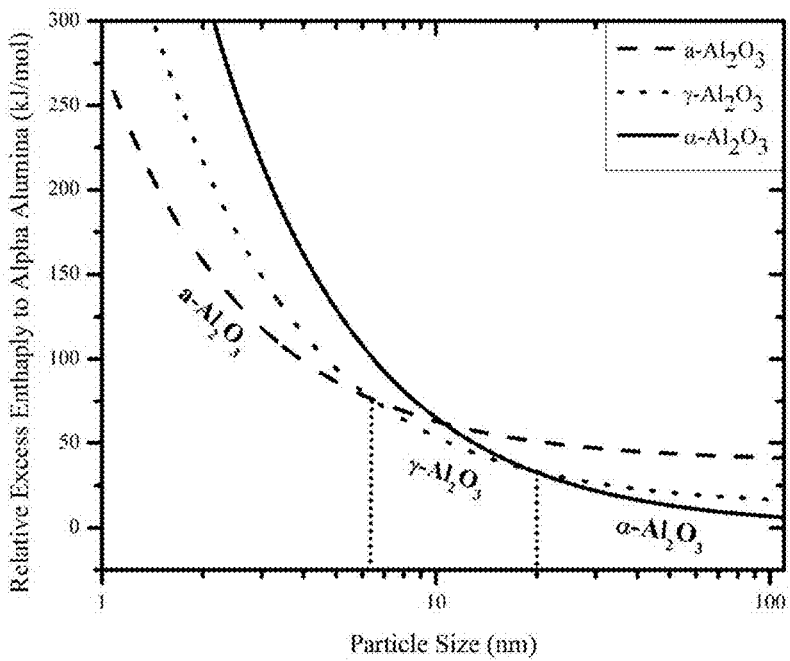

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

The present invention provides a process for producing metastable nanocrystalline alpha-alumina ($\alpha$-$Al_2O_3$) having a nanoparticle size smaller than 12 nm.

The process of the present invention utilizes temperature-controlled high-energy ball milling and a simple acid washing technique to provide a simple, scalable, industrial process for producing metastable nanocrystalline $\alpha$-$Al_2O_3$ having a nanoparticle size at or below the room-temperature thermodynamic $\alpha$-$Al_2O_3$ particle size limit of ~12 nm, i.e., below the size at which room-temperature thermodynamics would dictate that the alumina changes from the $\alpha$-phase to the $\gamma$-phase.

The general concept behind the present invention is that the $\alpha$-$Al_2O_3$ particles are ball-milled at a low processing temperature, typically room temperature, where the low processing temperature kinetically hinders any phase transformation of α-Al$_2$O$_3$ to γ-Al$_2$O$_3$ during the process because the activation barrier is too high.

Thus, in accordance with the present invention, a starting powder of α-Al$_2$O$_3$ crystallites having a particle size larger than 12 nm, typically about 50 nm, is placed into a ball-milling jar and is ball-milled at room temperature using a ball-milling media until the starting crystallites are reduced in size to a particle size of less than 12 nm. In most cases, the ball-milling media will be tungsten carbide-cobalt (WC-Co), though other containers and ball-milling media comprising materials harder than α-Al$_2$O$_3$, such as diamond jars and media, diamond-coated jars and media, or cubic boron nitride jars and/or media, can also be used.

In most embodiments, the starting α-Al$_2$O$_3$ crystallites are ball milled in a series of short time intervals in order to prevent the temperature of the α-Al$_2$O$_3$ crystals in the WC-Co ball-milling jar from increasing to a point where a phase change might occur. In a typical case, the starting crystals are ball-milled for about 30 minutes at time, with about 90 minutes being needed to reduce crystallites having a particle size of ~50 nm to crystallites having a size of less than 12 nm. However, one skilled in the art will readily appreciate that one or both of the time intervals needed to prevent temperature increases of the α-Al$_2$O$_3$ crystals or the total time needed to obtain a powder having the desired particle size may vary, depending on the volume of the WC-Co jar, the amount of the starting α-Al$_2$O$_3$ powder, or the amount of the WC-Co ball-milling media.

In other embodiments, the temperature of the α-Al$_2$O$_3$ can be kept down by using active cooling measures, such as performing the ball milling at cryogenic temperatures, i.e., at or below about −180° C.

In all cases, in accordance with the present invention, the ball-milling will be performed under a set of predetermined conditions configured to ensure that the starting α-Al$_2$O$_3$ crystallites remain in a metastable α-Al$_2$O$_3$ phase at all times and do not change to the γ-phase at any time during the ball-milling process.

The sub-12 nm α-Al$_2$O$_3$ powders produced by the ball-milling process in accordance with the present invention can then be washed with nitric acid and hydrogen peroxide to completely remove the WC-Co contamination on the surfaces of the particles.

High Resolution TEM showed that the individual crystallites resulting from this ball milling process have differing crystallographic orientations with nominal sphericity, and are a truly nanocrystalline powder.

The process in accordance with the present invention thus provides an industrial, scalable, and economical procedure that provides a new avenue for processing of nanocrystalline α-Al$_2$O$_3$. The success provided by the process of the present invention in WC-Co ball milling of large starting crystallites of α-Al$_2$O$_3$ down to metastable sub-12 nm crystallites without those crystallites undergoing an undesirable phase change was unexpected by the inventors and is contrary to what would normally be expected from the thermodynamic characteristics of the various phases of alumina. The results provided by the process of the present invention are vitally important since α-Al$_2$O$_3$ does not ordinarily exist at these crystallite sizes, and the current bottom-up synthesis approaches can only produce γ-Al$_2$O$_3$, which is an undesired phase for many applications, at these small crystal sizes.

EXAMPLE

The process in accordance with the present invention was employed on lab-synthesized and commercially available α-Al$_2$O$_3$ powders to demonstrate the universal nature of the approach and to re-reinforce its industrial scalability.

Lab-synthesized α-Al$_2$O$_3$ nanopowders were synthesized via a modified reverse strike co-precipitation route similar to other systems reported in the literature. See J. W. Drazin et al., "Phase Stability in Nanocrystals: A Predictive Diagram for Yttria-Zirconia," *Journal of the American Ceramic Society* 98, 1377-1384 (2015); and J. W. Drazin et al., "Phase Stability in Calcia-Doped Zirconia Nanocrystals," *Journal of the American Ceramic Society* 99, 1778-1785 (2016).

Aluminum nitrate nonhydrate (>98%, Sigma-Aldrich, St. Louis, Mo.) was dissolved in de-ionized water to form a clear, dilute solution. The cationic solution was then added drop-wise to a stirred 5M excess ammonium hydroxide solution where aluminum hydroxide formed as a white precipitate. The final mixture was washed with 190 proof denatured ethanol and centrifuged (5000 rpm for 4 min) 3 times to remove and replace the excess ammonia solution. The white precipitate was then dried at 70° C. for 48 hours. The dried powder was heated to 1200° C. and held at temperature for 2 hours to calcine the hydroxide to α-alumina with a crystallite size of 50 nm.

It is noted that 50 nm was the smallest possible crystallite size that we were able to produce in the lab such that the powder was 100% α-Al$_2$O$_3$. Unfortunately, all attempts at seeding the synthesis with 50+ nm α-Al$_2$O$_3$ powder (as reported by Li and Sun) were unable to lower the calcining temperature or the crystallite size. See J. G. Li et al., "Synthesis and sintering behavior of a nanocrystalline α-alumina powder," *Acta Materialia* 48, 3103-3112 (2000). Therefore, to test the efficacy of the ball-milling method of the present invention, the inventors decided to use a commercial α-Al$_2$O$_3$ powder having the smallest grain size commercially available (99.9+% α-Al$_2$O$_3$ powder obtained from Stanford Advanced Materials, Irvine, Calif.) and ball mill this commercial powder to shear or grind the agglomerates and grains and compare the results obtained to results obtained for the lab-synthesized powder.

The starting crystallite sizes for the lab-synthesized and commercial α-Al$_2$O$_3$ were 50 and 60 nm, respectively, as determined by diffraction peak broadening analysis.

The α-Al$_2$O$_3$ powders were ball milled in a SPEX 8000M using a cobalt cemented tungsten carbide vial in 3 g batches. The milling media consisted of four 6 mm and two 12 mm tungsten carbide (WC) balls (WC-Co, McMaster-Carr, Elmhurst, Ill.) giving a ball to powder mass ratio (BMR) was ~10:1. The batches were milled in 30 minutes intervals and re-oriented at each interval to ensure that the powder did not preferentially collect inside the vial during milling. The crystallite size of the lab-synthesized and commercial powders after milling was about 9.6 nm and 8.7 nm, respectively.

After ball milling, the powder was washed using a 5% (v/v) 15.4M HNO$_3$ in 30% H$_2$O$_2$ solution to dissolve the residual tungsten carbide-cobalt (WC-Co) contamination from the ball-milled powder in a manner similar to that done by Archer et al. in their previous work. See M. Archer et al., "Analysis of cobalt, tantalum, titanium, vanadium and chromium in tungsten carbide by inductively coupled plasma-optical emission spectrometry," *Journal of Analytical Atomic Spectrometry* 18, 1493-1496 (2003). The dissolution of the residual WC-Co contamination was performed at 95° C. while under magnetic stirring and was finished in under an hour. The mixture was then washed with 190-proof denatured ethanol 3 times.

X-ray diffraction (XRD) analysis of the resulting powders was performed on a 18 kW rotating anode Rigaku X-Ray Diffractometer (Rigaku, Tokyo, Japan) operated at 50 kV and 200 mA using a copper target. The crystallite size was calculated using JADE 9.6v software to perform a whole pattern fitting (WPF) refinement using PDF#10-0173 for $\alpha$-$Al_2O_3$ and PDF#51-0939 for WC-Co (when presenting the diffraction pattern). Specific surface area measurements were made on an ASAP 2020 sorption apparatus (Mircomeritics, Norcrosss, Ga.) using a five point liquid nitrogen adsorption measurement (BET theory). The reported values are an average of three consecutive measurements.

Figure 2A:
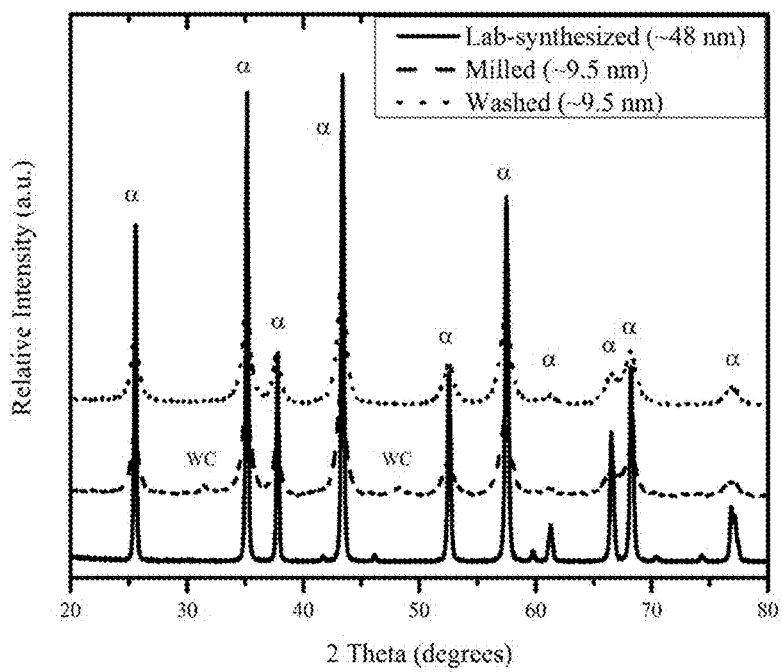
FIG. 2A AND 2B are plots of the X-ray diffraction patterns of lab-synthesized (FIG. 2A) and commercially prepared (FIG. 2B) $\alpha$-$Al_2O_3$ starting powder having a particle size of ~50 nm, a ~10 nm $\alpha$-$Al_2O_3$ powder produced from such starting powders after 270 minutes of ball milling, and the ~10 nm ball-milled $\alpha$-$Al_2O_3$ powder after washing with nitric acid and hydrogen peroxide.
Figure 2B:
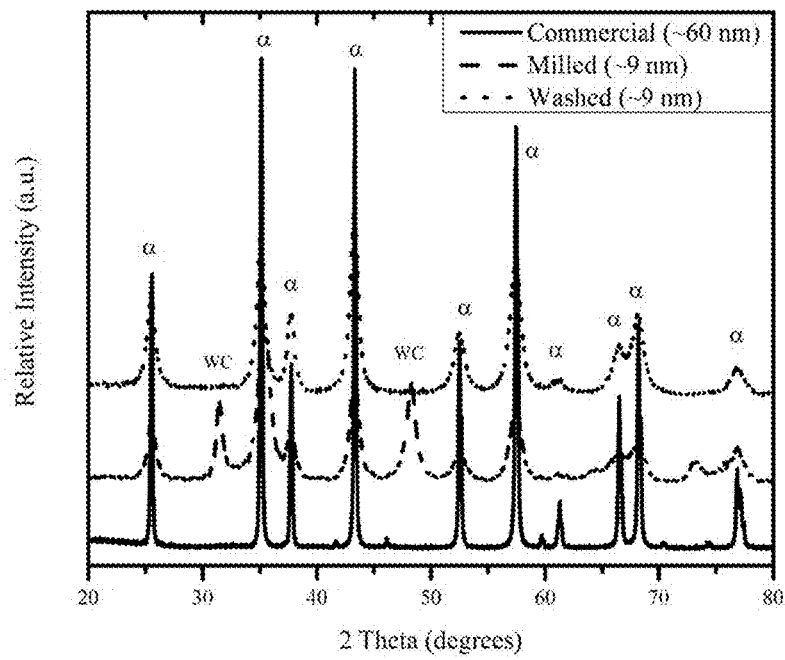

The results of the XRD analysis of the two $\alpha$-$Al_2O_3$ samples after ball milling for 270 minutes are shown in FIGS. 2A and 2B.

As can be seen from the plots in FIGS. 2A and 2B, both the milled the lab-synthesized and commercial powders retained their $\alpha$-structure even though their crystallite size (as determined by the width of the peaks in the XRD analysis using a Halder-Wagner analysis) was reduced below the thermodynamic phase-crossover size limit of 9.6 nm and 8.7 nm for the lab-synthesized (FIG. 2A) and commercial powders (FIG. 2B), respectively.

The powders, which were white before the milling, developed a greyish color after milling as a result of the WC-Co milling media wearing against and so contaminating the surface of the nanopowder. This contamination is also observable in the diffraction pattern. For example, the major peak seen at 31.8° in FIG. 2B is associated with this WC contamination.

In order to remove the WC contamination, a modified washing procedure was employed using nitric acid and hydrogen peroxide. The hydrogen peroxide oxidized the WC such that the product was dissolvable in nitric acid. See Archer, supra. With the low concentrations of cobalt cement used in this example, nitric acid was sufficient to prevent a cobalt passivation layer from forming; however, aqua regia, instead of nitric acid, can also be employed where appropriate to remove excess cobalt media from the milled nanopowder.

After this acid washing, the powders returned to their bright white color. The XRD of the powders after acid washing are shown by the dotted lines in FIGS. 2A and 2B, where there was no phase or grain size change in the powders. The elimination of the WC contamination peak and the return of the powder to a bright white color signify that the washing was sufficient to remove the WC-Co contaminate.

Figure 3:
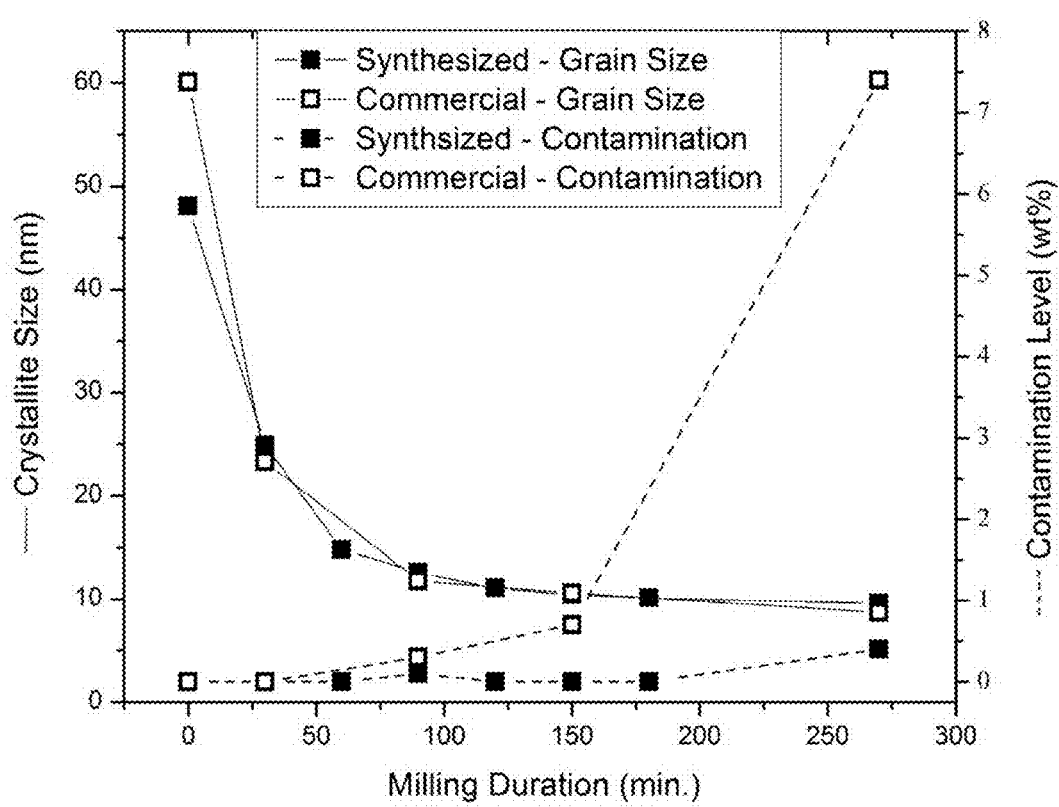
FIG. 3 is a plot showing grain size and WC-Co contamination of the lab-synthesized and commercially prepared $\alpha$-$Al_2O_3$ powders as a function of milling time.

The plots in FIG. 3 show that there is a practical limit to the minimum obtainable crystallite size. The time-dependency of the crystallite size (solid lines) and the WC contamination levels (dotted lines) of the two powders show that the crystallite size of both powders followed very similar, almost overlapping, exponential decaying functions plateauing near 10 nm.

The similarity in trends of the two powders suggests that the technique of the present invention may not be well suited to produce nanopowders much smaller than 9 nm. The plateau in the final sub-10 nm crystallize size can be explained by a Hall-Petchian-type phenomenon: as the size of the powder decreases, the hardness of the individual crystals and agglomerates increases to a point where it is significantly harder than the milling media, wearing the WC balls in the ball-milling chamber further. See D. Chrobak et al., "Deconfinement leads to changes in the nanoscale plasticity of silicon," *Nat Nano* 6, 480-484 (2011); and Y. Tian et al., "Ultrahard nanotwinned cubic boron nitride," *Nature* 493, 385-388 (2013).

Consequently, there is an equilibrium where the $\alpha$-$Al_2O_3$ powder will be as hard as or harder than the milling media such that continued milling will not significantly alter the grain size. This assumption is supported by the WC contamination curve in FIG. 3, which is essentially zero for the lab-synthesized powder produced in accordance with the present invention until minute 175, but then increases rapidly while the grain size barely decreases.

Interestingly, the commercial $\alpha$-$Al_2O_3$ powder accumulated WC contamination at an earlier milling time compared to the lab-synthesized powder having similar grain sizes. One reason for this difference in contamination levels could be the agglomeration state of the powders: i.e., the amount of free surfaces in the powder.

Brunauer-Emmett-Teller (BET) surface area analysis showed that the lab-synthesized and commercial powder, after milling and washing, had a surface area per gram of 62.101±0.217 and 42.983±0.120 $m^2 \cdot g^{-1}$ respectively. Consequently, even if the crystallite size plateau of 10 nm is an artifact of the milling time, the amount of WC contamination would grow too fast to produce significantly smaller grain sizes. Regardless, this is the first time that a simple procedure, with high yield, has demonstrated the feasibility of producing $\alpha$-$Al_2O_3$ with high specific surface areas and crystallite sizes at or below the $\gamma$-phase thermodynamic crossover limit.

In another examination of the metastable $\alpha$-$Al_2O_3$ nanopowders produced in accordance with the method of the present invention, TEM samples were prepared by dispersing the nanopowders in methonal and then pipetting the nanopowder dispersion onto a holey carbon grid. All specimens were examined in a FEI Tecnai G2 TEM with LaB6 filament operated at 300 kV.

Figure 4:
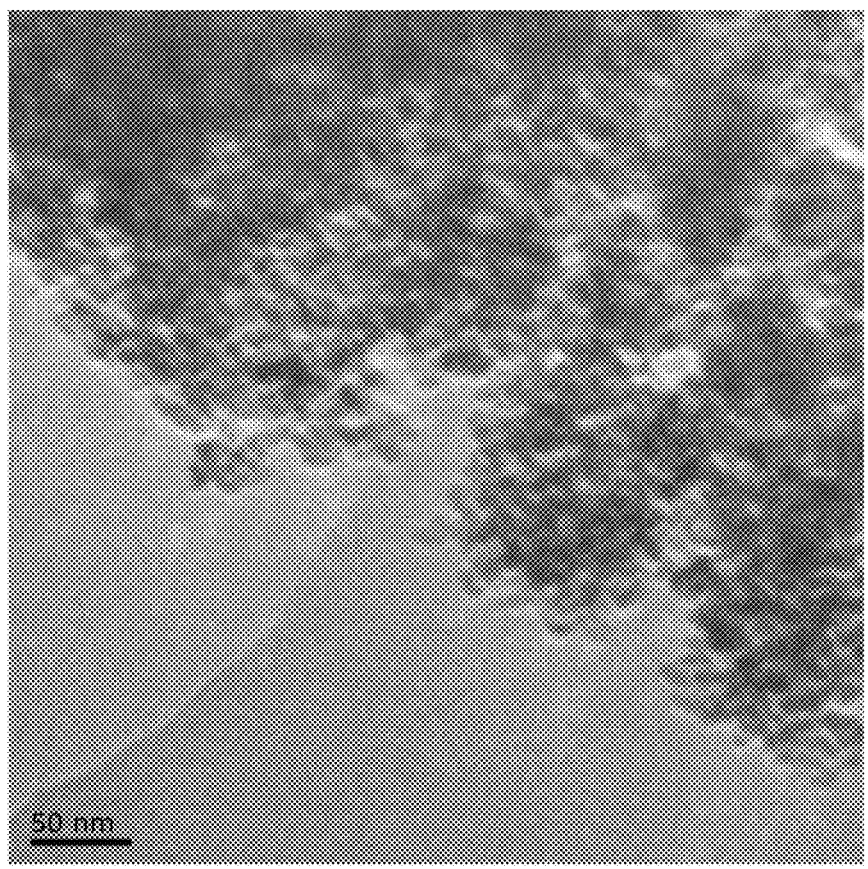
FIG. 4 is a Transmission Electron Microscope (TEM) image of an $\alpha$-$Al_2O_3$ powder produced from 270 minutes of ball milling and washing in accordance with the present invention on top of a holey carbon grid, showing that the grain size of the powder is well below 50 nm.

FIG. 4 shows a TEM micrograph of an $\alpha$-$Al_2O_3$ nanopowder produced from lab-synthesized $\alpha$-$Al_2O_3$ starting powder, after ball-milling for about 270 minutes at approximately 30-minute intervals and removal of contaminants. The crystallite size of this powder is less than 10 nm, consistent with the reported XRD grain size. In addition, as can be easily seen from the image in FIG. 4, the powder exhibits a high level of agglomeration, which would be expected for sub-10 nm size particles because of their high electrostatic attraction to one another.

Figure 5:
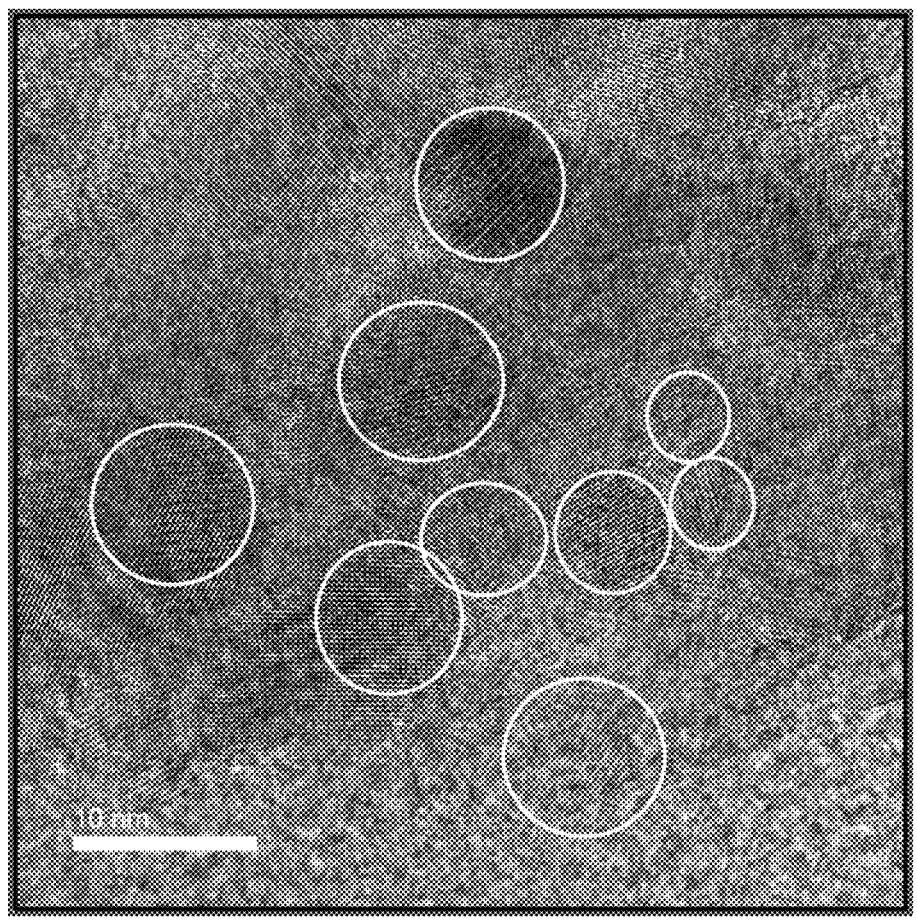
FIG. 5 is a High Resolution TEM image of the individual alumina crystallites produced by a ball milling process in accordance with one or more aspects of the present disclosure.

FIG. 5 is a high-resolution TEM image of the powder depicted in FIG. 4, and reveals that the small grains shown in FIG. 4 have unique crystallographic orientations and are distinct individual particles. The observed crystallite size of the particles, on the order of 10 nm, matches well with the XRD grain size. The image further suggests that the crystals are not related by low angle misorientations, further showing that the produced powder has a sub-10 nm grain size.

Thus, although it is not presently feasible to directly synthesize nanocrystalline $\alpha$-$Al_2O_3$ having a sub-12 nm grain size, the present invention provides a method for producing a metastable $\alpha$-$Al_2O_3$ nanocrystalline powder having a crystallite size of less than 12 nm using a novel WC-Co ball milling and nitric acid and hydrogen peroxide washing procedure. The procedure utilizes high-energy room-temperature ball milling that is conducted at a series of short intervals in order to avoid the $\alpha$- to $\gamma$-phase transition despite the final grain size being below the thermodynamic size limit for the $\alpha$-phase, while the washing effectively removed the milling contamination from the final powders. The procedure worked equally well for the lab-synthesized powders as for the commercial powders, producing similar crystallite sizes with sufficiently high yields that the overall procedure could be scaled up with minimal modifications. Therefore, this novel technique is the first to provide a pathway for the industrial production of metastable nanocrystalline α-Al$_2$O$_3$ below the thermodynamic size limit.

Although particular embodiments, aspects, and features have been described and illustrated, one skilled in the art would readily appreciate that the invention described herein is not limited to only those embodiments, aspects, and features but also contemplates any and all modifications and alternative embodiments that are within the spirit and scope of the underlying invention described and claimed herein. The present application contemplates any and all modifications within the spirit and scope of the underlying invention described and claimed herein, and all such modifications and alternative embodiments are deemed to be within the scope and spirit of the present disclosure.

What is claimed is:

1. A process for producing a metastable alpha alumina (α-Al$_2$O$_3$) nanocrystalline powder having a particle size of less than 12 nm, comprising:

placing starting crystallites of α-Al$_2$O$_3$ having a particle size larger than 12 nm into a ball-milling jar containing a ball-milling media; and ball-milling the α-Al$_2$O$_3$ starting crystallites to produce a metastable ball-milled α-Al$_2$O$_3$ nanocrystalline powder having a particle size of less than about 12 nm;

wherein the ball-milling is performed in a plurality of predetermined time intervals for a predetermined total time, wherein a length of each time interval and the total time of ball-milling prevent the α-Al$_2$O$_3$ from undergoing a phase change to γ-Al$_2$O$_3$, such that the α-Al$_2$O$_3$ starting crystallites and the ball-milled α-Al$_2$O$_3$ nanocrystalline powder remain in the α-Al$_2$O$_3$ phase at all times.

2. The process according to claim 1, wherein the ball-milling media is WC-Co.

3. The process according to claim 1, wherein the ball-milling is conducted in a series of 30-minute time intervals.

4. The process according to claim 1, further comprising washing the ball-milled α-Al$_2$O$_3$ nanopowders with nitric acid and hydrogen peroxide.

* * * * *